(12) United States Patent
Park et al.

(10) Patent No.: US 9,485,364 B2
(45) Date of Patent: Nov. 1, 2016

(54) METHOD OF DISPLAYING ICONS ACCORDING TO SERVICE USAGE STATES AND MOBILE TERMINAL SUPPORTING THE SAME

(71) Applicant: Samsung Electronics Co., Ltd., Gyeonggi-do (KR)

(72) Inventors: Jinyoung Park, Gyeonggi-do (KR); Yongho You, Seoul (KR)

(73) Assignee: Samsung Electronics Co., Ltd (KR)

( * ) Notice: Subject to any disclaimer, the term of this patent is extended or adjusted under 35 U.S.C. 154(b) by 157 days.

(21) Appl. No.: 14/152,527

(22) Filed: Jan. 10, 2014

(65) Prior Publication Data
US 2014/0194089 A1  Jul. 10, 2014

(30) Foreign Application Priority Data

Jan. 10, 2013  (KR) .................. 10-2013-0002895

(51) Int. Cl.
| H04M 15/00 | (2006.01) |
| H04W 4/18 | (2009.01) |
| H04W 4/26 | (2009.01) |
| H04M 1/725 | (2006.01) |
| H04L 12/14 | (2006.01) |

(52) U.S. Cl.
CPC .......... *H04M 15/61* (2013.01); *H04L 12/1435* (2013.01); *H04M 1/72519* (2013.01); *H04W 4/18* (2013.01); *H04W 4/26* (2013.01); *H04L 12/141* (2013.01); *H04L 12/1417* (2013.01); *H04M 1/72522* (2013.01); *H04M 15/852* (2013.01); *H04M 2250/22* (2013.01)

(58) Field of Classification Search
CPC ............ H04M 15/61; H04M 15/852; H04M 2250/22; H04W 4/26; H04L 12/141; H04L 12/1417; H04L 12/1435
USPC .................................... 455/405, 406
See application file for complete search history.

(56) References Cited

U.S. PATENT DOCUMENTS

| 2004/0203374 | A1 | 10/2004 | Zilliacus | |
| 2005/0054324 | A1 | 3/2005 | Chmaytelli et al. | |
| 2007/0035513 | A1 | 2/2007 | Sherrard et al. | |
| 2012/0101952 | A1* | 4/2012 | Raleigh et al. | 705/304 |
| 2012/0158829 | A1* | 6/2012 | Ahmavaara et al. | 709/203 |
| 2012/0278722 | A1* | 11/2012 | Raleigh et al. | 715/735 |
| 2012/0315882 | A1 | 12/2012 | Chang et al. | |
| 2013/0055136 | A1* | 2/2013 | Aaron et al. | 715/772 |
| 2013/0246413 | A1* | 9/2013 | Lee et al. | 707/731 |
| 2013/0291003 | A1 | 10/2013 | Lee | |
| 2014/0189595 | A1* | 7/2014 | Waldman et al. | 715/835 |

FOREIGN PATENT DOCUMENTS

| EP | 1 139 679 | 10/2001 |
| KR | 1020060016417 | 2/2006 |
| KR | 1020080019614 | 3/2008 |
| KR | 1020120080517 | 7/2012 |
| KR | 1020120135720 | 12/2012 |
| WO | WO 2008/029231 | 3/2008 |
| WO | WO 2012/047932 | 4/2012 |

* cited by examiner

*Primary Examiner* — Barry Taylor
(74) *Attorney, Agent, or Firm* — The Farrell Law Firm, P.C.

(57) ABSTRACT

A method and apparatus for displaying icons according to data communication service usage states are provided. The method includes collecting information on the remaining service amount for at least one service having a service usage limit; and displaying a color adjusted icon based on the remaining service amount.

27 Claims, 11 Drawing Sheets

METHOD OF DISPLAYING ICONS ACCORDING TO SERVICE USAGE STATES AND MOBILE TERMINAL SUPPORTING THE SAME

PRIORITY

This application claims priority under 35 U.S.C. §119(a) to Korean Patent Application Serial No. 10-2013-0002895, which was filed in the Korean Intellectual Property Office on Jan. 10, 2013, the entire disclosure of which is incorporated herein by reference.

BACKGROUND OF THE INVENTION

1. Field of the Invention

The present invention relates generally to the display of icons on a mobile terminal, and more particularly, to a method and mobile terminal for displaying icons according to data communication usage states wherein, when an icon supported by a service plan with data communication limits is selected, the appearance of the selected icon is changed in accordance with the available amount of services remaining.

2. Description of the Related Art

Mobile terminals supporting communication have entered into widespread use due to their small size enabling ease of portability. Recently, increased sizes of touchscreens, advanced hardware and software support, and diversified digital content have dramatically accelerated the popularization of mobile terminals.

As communication functions of mobile terminals are essential to users, a variety of functions have been developed enabling users to easily and conveniently manage subscriptions to and plans with various services. In particular, with the introduction of data communication to mobile terminals, functions for Internet access or music content utilization have been popularized.

Typically, users of data communication functions supported by mobile terminals are normally charged according to the amount of data consumed. A user utilizing a specific data communication function is charged according to a service plan agreed to with a service provider. Meanwhile, a service provider providing data communication services often provides a function enabling a user to examine the amount of communication services used. However, such a function may be inconvenient for the user. For example, to identify the service usage amount, the user may have to execute a procedure to access a web server of the service provider, wait for receipt of data provided by the web server, and then find the desired information among the received data. Exasperating the user's inconvenience further, the execution of this function by the user may result in additional charges to the user, as the function itself uses data communication services. In instances when the user has limits on the amount of data communication services he or she is able to consume during a given time period, and the remaining amount of data communication services for that period is small, if the user wishes to examine the current service usage amount so as not to exceed the limit, doing so may be an unreasonable burden to the user.

SUMMARY

The present invention has been made to address at least the above mentioned problems and/or disadvantages and to provide at least the advantages described below. Accordingly, an aspect of the present invention is to provide a method of displaying icons according to service usage states and a mobile terminal supporting the same wherein the color of an icon is partly changed according to the available amount of corresponding services so that the user can readily determine the available service amount.

In accordance with an aspect of the present invention, a mobile terminal supporting the display of icons based on service usage states is provided. The mobile terminal includes a communication unit configured to support network access for at least one service having a usage limit; a control unit configured to control displaying the icons, when the communication unit is connected to a network permitting unlimited free-of-charge service usage, an icon associated with the service as an icon filled with a color image, and when the communication unit is connected to a network restricting service usage according to the usage limit, an icon associated with the service as a color adjusted icon composed of a black-and-white image representing the used service amount and a color image representing the remaining service amount; and a display unit to display the color adjusted icon.

In accordance with another aspect of the present invention, a method of displaying icons according to service usage states for a mobile terminal is provided. The method includes examining a network connection state for at least one service having a usage limit; displaying, when the mobile terminal is connected to a network permitting unlimited free-of-charge service usage, an icon associated with the service as an icon filled with a color image; and displaying, when the mobile terminal is connected to a network restricting service usage according to the usage limit, the icon associated with the service as a color adjusted icon composed of a black-and-white image representing the used service amount and a color image representing the remaining service amount.

In accordance with another aspect of the present invention, a method of displaying icons according to service usage states for a mobile terminal is provided. The method includes collecting information on the remaining service amount for at least one service having a usage limit; and displaying a color adjusted icon according to the information on the remaining service amount.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

Figure 1:
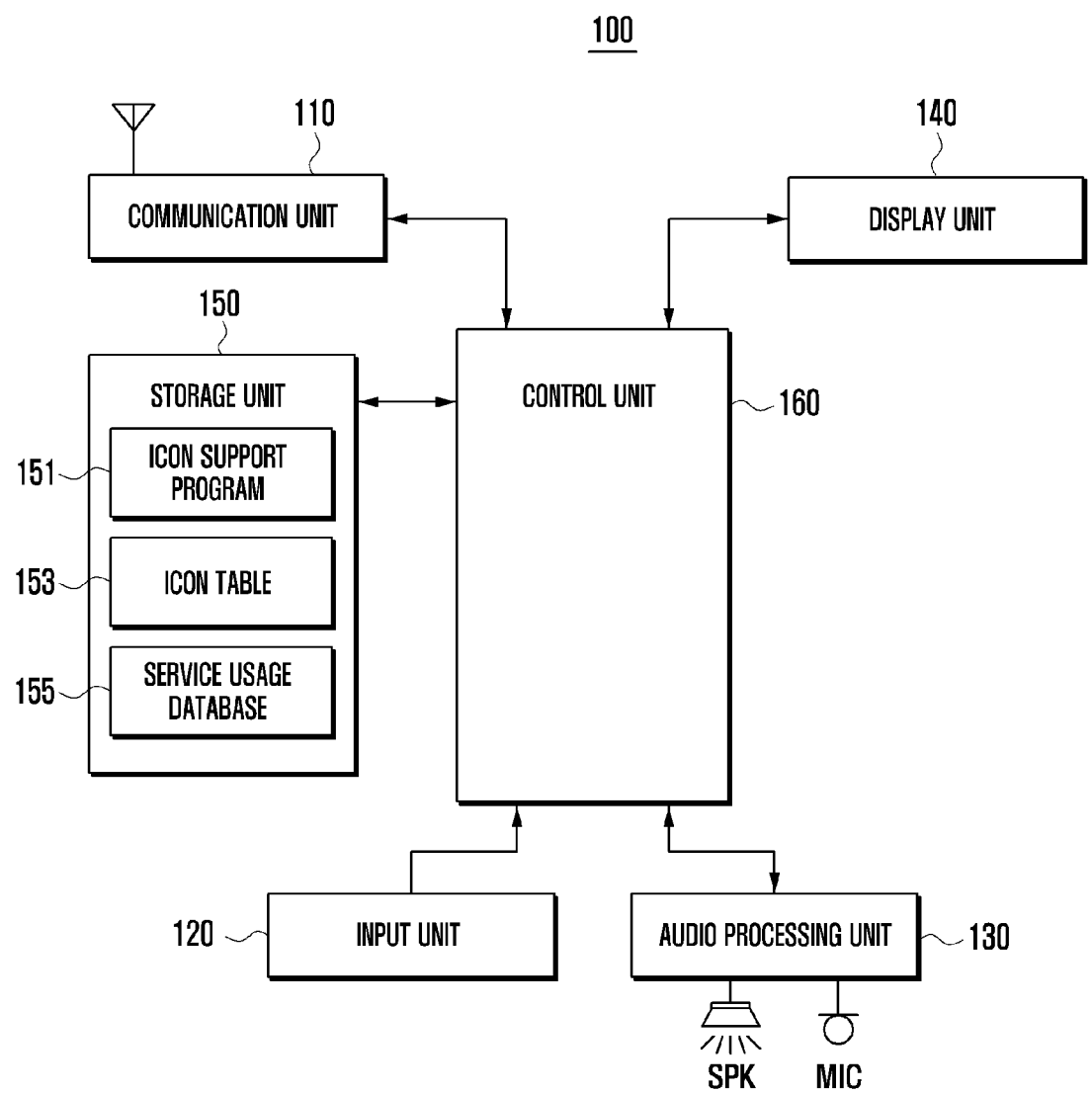
FIG. 1 is a block diagram of a mobile terminal capable of displaying icons based on service usage states according to an embodiment of the present invention.

Hereinafter, various embodiments of the present invention will be described in detail with reference to the accompanying drawings. Detailed descriptions of well-known functions and structures incorporated herein may be omitted to avoid obscuring the subject matter of the present invention. Detailed descriptions of components having substantially the same configurations and functions may also be omitted. In the drawings, some elements are exaggerated or only outlined in brief, and thus may be not drawn to scale. The present invention is not limited by relative sizes of objects and intervals between objects in the drawings.

FIG. 1 is a block diagram of a mobile terminal 100 capable of displaying icons based on the available amount of services according to an embodiment of the present invention.

"Services", as defined herein, may include paid communication services provided through the communication function of the mobile terminal 100. Services may be related to web access, use of data files, music files, video files, or text files after web access. Services may also be charged in a composite manner. For example, when digital rights management (DRM) protected content is used through the communication function of the mobile terminal 100, a content service fee and a data service fee may be simultaneously charged to the user of the mobile terminal 100. Here, the data service fee may be zero or charged on a pay-per-use basis according to types of networks to which the mobile terminal 100 is connected.

Referring to FIG. 1, the mobile terminal 100 includes a communication unit 110, an input unit 120, an audio processing unit 130, a display unit 140, a storage unit 150, and a control unit 160. The input unit 120 and the display unit 140 having an input function may act as an input means for the mobile terminal 100.

The mobile terminal 100 having the above configuration may collect information regarding services to which the user has subscribed, the amount of service used for each subscribed service and the amount of service remaining for each subscribed service, and apply the collected information to icons associated with the subscribed services. In particular, the mobile terminal 100 represents the amount of service remaining as a color change of the corresponding icon. Hence, the user may be readily aware of the remaining amount of a service by viewing the corresponding icon.

To this end, the communication unit 110 supports utilization of communication services of the mobile terminal 100. In particular, the communication unit 110 may establish a data communication channel to support communication services with usage limitations, such as web access based on data communication, use of music content based on data communication, and video calls based on data communication. The remaining service amount may be obtained by subtracting the service amount used through a data communication channel established by the communication unit 110 from the total service amount agreed upon at the time of subscription. Among various services supportable through the communication unit 110, a data communication service with a usage limit is described as a service of the present invention. However, the present invention is not limited thereto. For example, a usage limit may be placed on a function for placing voice calls or sending text messages. To support use of services, the mobile terminal 100 outputs icons for selecting and activating services on the display unit 140. Various icons may be provided to use data communication services. For example, a web access icon, a music site access icon, a video call icon, a game icon, a cloud server access icon, a search icon and the like may be provided to support network access through a data communication channel and connection to a desired server apparatus or another terminal. The communication unit 110 may include at least one of a 2G, 3G or 4G mobile communication module, a Wi-Fi communication module, and a short-range communication module.

The input unit 120 is configured to generate various input signals needed for operation of the mobile terminal 100. The input unit 120 may include various input means such as a keyboard, keypad and key buttons according to compatibility options of the mobile terminal 100. To generate input signals for control or user function operation of the mobile terminal 100, the input unit 120 may be composed of a touch panel and a touch map output on a display panel. The input unit 120 may be configured to include a touch pen and a pen touch panel.

The input unit 120 may be used to generate an input signal for outputting an icon display screen having one or more icons whose color is adjusted according to the remaining service amount, an input signal for selecting one icon, and an input signal for controlling a function activated by icon selection. When the remaining service amount is zero or less than a preset level, the user may use the input unit 120 to generate an input signal for issuing a purchase request for the corresponding service. An input signal generated by the input unit 120 is sent to the control unit 160, which performs a function according to the input signal. The input unit 120 may generate an input signal for removing the icon display screen (for example, activating a sleep state), and an input signal for deactivating the sleep state according to user control.

The audio processing unit 130 may output various audio data sets for operation of the mobile terminal 100, audio data produced by playback of an audio file stored in the storage unit 150, or audio data received from external sources. The audio processing unit 130 may also collect audio data. To this end, the audio processing unit 130 may include a speaker SPK and a microphone MIC. In particular, the audio processing unit 130 may output various audio signals to support icon display based on the remaining service amount. For example, when an icon having a color adjustment according to the remaining service amount is selected, the audio processing unit 130 may output a sound notification indicating the remaining service amount. If the remaining service amount associated with an icon is less than or equal to a preset level, the audio processing unit 130 may output a corresponding sound alert or notification and output a sound notification for extending the service usage limit. To support sound notification output, the mobile terminal 100 may store various sound recordings in the storage unit 150 in advance.

The display unit 140 may output various screens needed in the course of using the mobile terminal 100, such as an idle screen, menu screen, memo or e-mail writing screen and webpage output screen. As described before, the display unit 140 may include a touch panel and display panel stacked as a touchscreen and may act as an input means.

In particular, the display unit 140 may output an icon display screen containing at least one icon. Among icons output on the display unit 140, the color of an icon associated with a service having a usage limit may be adjusted according to the remaining service amount. It is possible to adjust the transparency of an icon associated with a service having a usage limit according to the remaining service amount. However, transparency adjustment of an icon may cause the icon to be unnoticed by the user, contradicting intuitive user awareness of the remaining service amount. Hence, in the present invention, for the purpose of ensuring intuitive awareness by the user of the remaining service amount, the color of an icon is partly changed while maintaining the shape of the icon. For example, in an icon associated with a service having a usage limit, to clearly indicate the type and availability of the service, the used service amount may be represented in black and white and the remaining service amount may be represented in color. Display of an icon associated with a service having a usage limit on the display unit 140 is described in more detail below.

The storage unit 150 may store an operating system for operating the mobile terminal 100, and various data and application programs or algorithms implementing user functions. In particular, to support icon color adjustment based on the remaining service amount, the storage unit 150 may store an icon support program 151, an icon table 153, and a service usage database 155.

For icon color adjustment based on the remaining service amount, the icon support program 151 may include a routine for identifying an icon associated with a service having a usage limit, a routine for collecting information on a service associated with the identified icon, a routine for adjusting the color of the icon according to collected service information, and a routine for outputting the color adjusted icon. Here, the routine for collecting information on a service may include a routine for collecting information on the total service amount, a routine for collecting information on the used service amount, and a routine for collecting information on the remaining service amount. The routine for collecting information on a service may further include at least one of a routine for computing the remaining service amount by accumulating and storing the used service amount, and a routine for connecting to a corresponding service provider server and obtaining information on the remaining service amount therefrom.

The icon table 153 stores various icons associated with services supported by the mobile terminal 100. Each icon may be a type of image, including link information as to a specific service, and may be output at a position on the display unit 140 under the control of the control unit 160. When an icon output on the display unit 140 is selected, the control unit 160 may activate a user function or a communication service according to the link information of the selected icon.

For a given service, the icon table 153 may store a group of related icons with colors adjusted according to the ratio of the remaining service amount to the total service amount. For example, for a web access service, the icon table 153 may store a group of web access icons with colors indicating ratios of the remaining service amount from 1 to 100 percent. Here, the web access icons may have different colors for every ten percent or for every one percent in the remaining service amount. Alternatively, for a given service, the icon table 153 may store a black-and-white icon and multiple color icons indicating ratios of the remaining service amount from 1 to 100 percent. Simultaneous output of the black-and-white icon and a color icon in an overlapped manner, on the display unit 140, may intuitively present the remaining service amount. The icon table 153 may be excluded when the icon output routine sets the saturation of a part of a color icon to black-and-white.

The service usage database 155 is used to collect various types of information on utilization of services in the mobile terminal 100. For example, the service usage database 155 may store information on the used amount, total amount and remaining amount of a data communication service. The service usage database 155 may store information on the used amount, total amount and remaining amount of a music content service or a video content service. Information elements stored in the service usage database 155 may be accumulated or updated according to usage of services in the mobile terminal 100. Service related information elements received from service provider servers may be stored in the service usage database 155.

The control unit 160 controls signal flow and collection and output of information to support display of icons with colors adjusted according to the remaining service amounts. To this end, the control unit 160 may have a configuration illustrated in FIG. 2.

Figure 2:
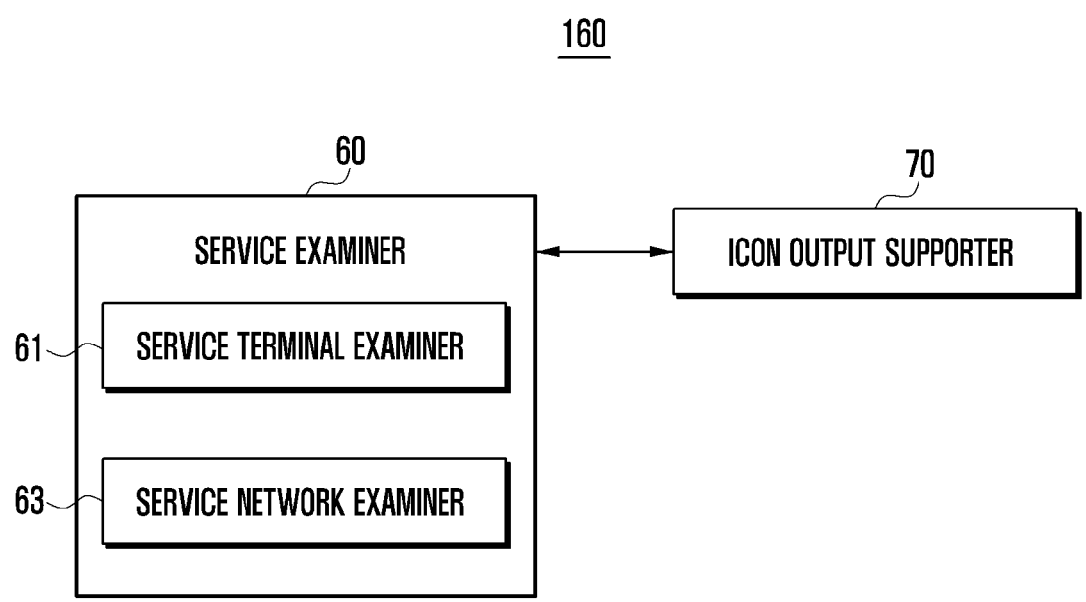
FIG. 2 illustrates a block diagram of a control unit in the mobile terminal shown in FIG. 1.

FIG. 2 illustrates a block diagram of the control unit 160 in the mobile terminal 100.

Referring to FIG. 2, the control unit 160 may include a service examiner 60 and an icon output supporter 70. The service examiner 60 may include at least one of a service terminal examiner 61 and a service network examiner 63.

The service examiner 60 collects information on the remaining amount of a service with a usage limit and forwards the information about the remaining service amount to the icon output supporter 70. To this end, the service examiner 60 stores information regarding enrolled-in services in the service usage database 155 of the storage unit 150. In particular, the service examiner 60 includes service terminal examiner 61 and service network examiner 63. The service terminal examiner 61 collects, for those services having usage limits, usage information from the mobile terminal 100. The service network examiner 63 collects information on services from corresponding service provider servers. Here, the service examiner 60 may operate either the service terminal examiner 61 or the service network examiner 63 according to terminal or user settings.

For a service, the service terminal examiner 61 collects information on the remaining service amount according to service usage in the mobile terminal 100, store the service remaining amount information, and forward the same to the icon output supporter 70. More specifically, when an icon associated with a service is selected from the icon display screen, the service terminal examiner 61 collects information on the service amount used by the function related to the selected icon. For example, the service terminal examiner 61 may collect information on the used amount of a data, music, video or text content service. The service terminal examiner 61 stores the service used amount information in the service usage database 155. For each service, the service terminal examiner 61 may collect information on the total service amount and store the service total amount information in the service usage database 155 in advance. To this end, when a subscription is made to a service, the service terminal examiner 61 may obtain information on the total service amount from the corresponding service provider server.

When a service is used during operation of the mobile terminal 100, the service terminal examiner 61 collects information on the used service amount, computes the remaining service amount by subtracting the used service amount from the total service amount, and stores the remaining service amount. Meanwhile, as the used service amount computed by the mobile terminal 100 may be different from that actually recorded by the service provider server, to support information synchronization, the service terminal examiner 61 may connect to the service provider server, obtain information on the used service amount or the remaining service amount therefrom, and update corresponding information in the service usage database 155 on a periodic basis or upon user request. When output of the icon display screen is requested or an event for outputting the remaining service amount (e.g. pointing to an icon) is generated, the service terminal examiner 61 may deliver information on the remaining service amount stored in the service usage database 155 to the icon output supporter 70.

The service network examiner 63 may connect to a service provider server to collect information on the remaining service amount. More specifically, in response to generation of a preset event on an icon, the service network examiner 63 controls the communication unit 110 to connect to a service provider server providing the service associated with the icon. Here, the preset event may correspond to an input event for output of the icon display screen, an input event pointing to an icon on the icon display screen, a hovering input for icon selection on the icon display screen, or the like. The preset event may also correspond to the arrival of a period of time or the arrival of a particular point in time.

The service network examiner 63 may be configured to have a plurality of network examiners corresponding to individual service provider servers providing services enrolled in the service usage database 155. For example, when the mobile terminal 100 has subscribed to a web access service, a music content service and a video content service (each with a usage limit), the service network examiner 63 may generate three network examiners, each of which may connect to the corresponding service provider server and obtain information on the remaining service amount. The service network examiner 63 may store collected information on the remaining service amounts in the service usage database 155 for update, or may transfer collected information on the remaining service amounts to the icon output supporter 70 in real-time without database update.

The icon output supporter 70 receives information on the remaining service amount from the service examiner 60 and outputs a color adjusted icon on the basis of the received information. Here, the icon output supporter 70 may select one of the color adjusted icons stored in the icon table 153 and output the selected icon at a given position on the display unit 140. More specifically, when an input event for outputting the icon display screen is generated, the icon output supporter 70 identifies icons, to which information on the remaining service amount is to be applied, among icons contained in the icon display screen. To this end, the icon output supporter 70 may refer to the service usage database 155 stored in the storage unit 150. For each identified icon, the icon output supporter 70 obtains information on the remaining service amount from the service usage database 155 or the service network examiner 63, and outputs an icon with a color adjusted according to the remaining service amount on the display unit 140. Here, the icon output supporter 70 may select an icon with a color adjustment according to the remaining service amount from a group of related icons stored in the icon table 153. Alternatively, the icon output supporter 70 may adjust the color of an icon according to the remaining service amount and output the color adjusted icon on the display unit 140. That is, for a service having a usage limit, a group of related icons with different colors are provided in advance in the former case, or the color of one icon is adjusted upon output to the screen in the latter case.

Figure 3:
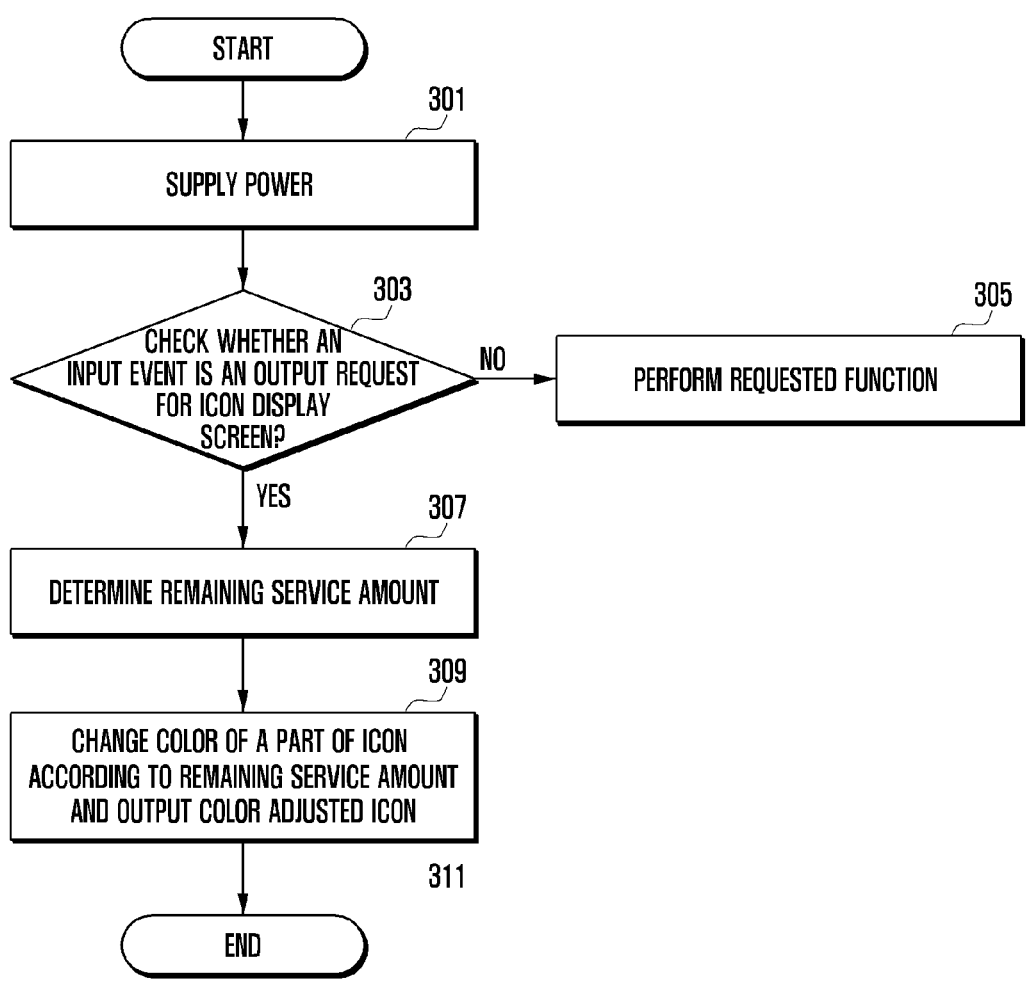
FIG. 3 is a flowchart of a method for displaying icons based on service usage states according to an embodiment of the present invention.

FIG. 3 is a flowchart of a method for displaying icons based on service usage states according to an embodiment of the present invention.

Referring to FIG. 3, in the icon display method, at step 301, the control unit 160 of the mobile terminal 100 supplies power from a power source to individual components thereof. After power is supplied, the control unit 160 monitors generation of an input event by the input unit 120.

Upon generation of an input event, the control unit 160, at step 303, checks whether the input event is an output request for the icon display screen. If the input event is not an output request for the icon display screen, the control unit 160 proceeds to step 305 wherein the control unit 160 performs a function indicated by the input event. For example, the control unit 160 may adjust the audio volume for music content in playback, output a lock screen or unlock the lock screen according to the input event. If the input event is an output request for the icon display screen in step 303, the control unit 160 proceeds to step 307 wherein the control unit 160 identifies an icon associated with a service having a usage limit among icons contained in the icon display screen and determines the remaining service amount for the identified icon. For example, the control unit 160 may determine the remaining service amount for a web access service, music content service, video content service, or DRM content service by subtracting the used service amount from the total service amount set by the corresponding service plan. Here, as described above, the control unit 160 may determine the remaining amount value for a service by using both the accumulated usage value stored in the storage unit 150 and the total amount value pre-stored therein. Alternatively, for a service, the control unit 160 may send a query for the remaining amount value to the service provider server providing the service and receive the corresponding response from the service provider server.

Figure 4:
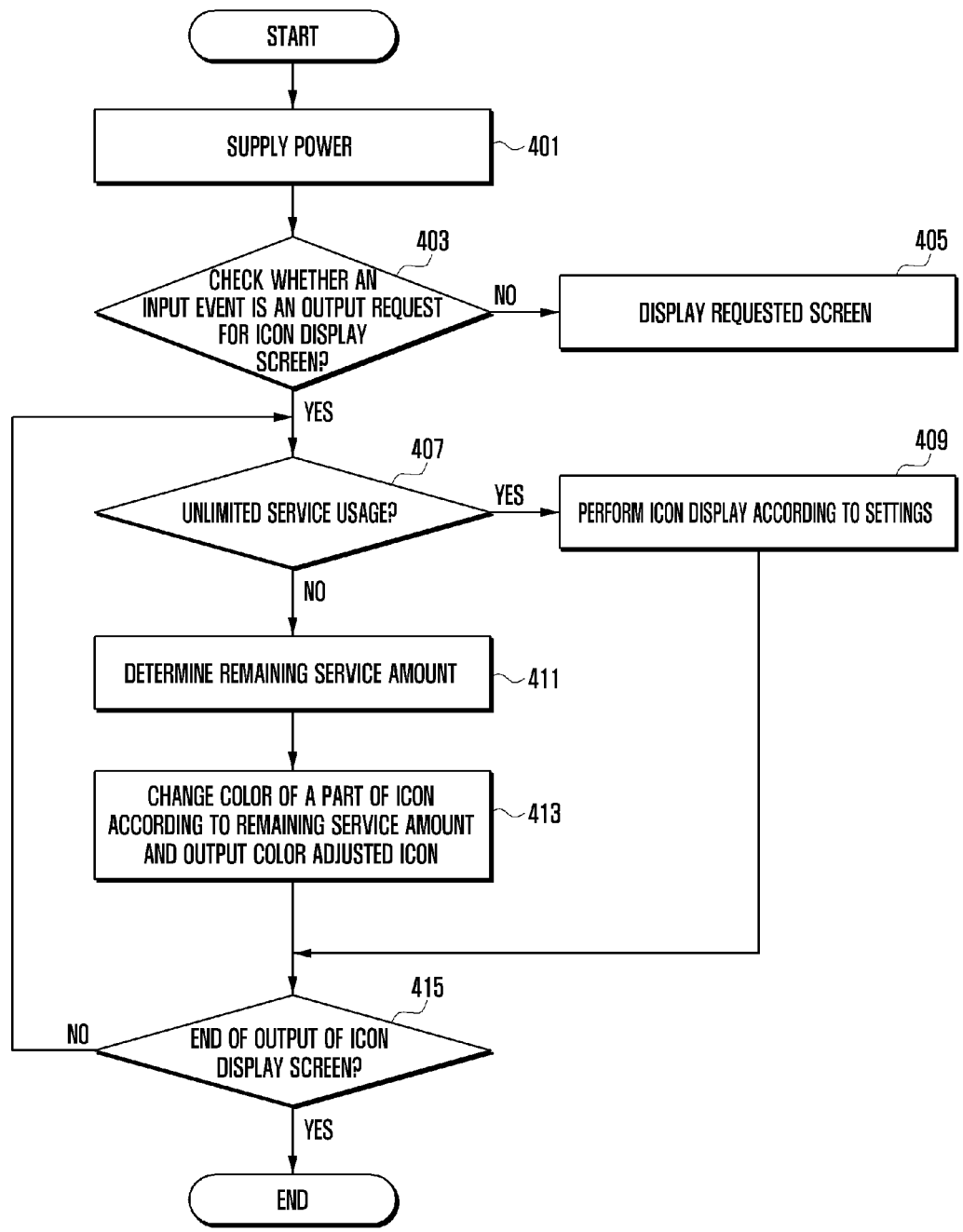
FIG. 4 is a flowchart of another method for displaying icons based on service usage states according to an embodiment of the present invention.

At step 309, the control unit 160 changes the color of a part of an icon to be output in accordance with the corresponding remaining amount value and outputs the color adjusted icon on the display unit 140. Here, the control unit 160 may select an icon with a color adjustment in accordance with the remaining service amount from the icon table 153, or may adjust the color of a part of an icon according to the remaining service amount and output the color adjusted icon on the display unit 140. FIG. 4 is a flowchart of a network-based method for displaying icons based on service usage states according to an embodiment of the present invention.

Referring to FIG. 4, at step 401, the control unit 160 of the mobile terminal 100 supplies power from a power source to individual components thereof. Upon generation of an input event, the control unit 160 checks, at step 403, whether the input event is an output request for the icon display screen. If the input event is not an output request for the icon display screen, the control unit 160 proceeds to step 405 at which the control unit 160 may perform a function indicated by the input event. For example, the control unit 160 may output information stored in the storage unit 150, unlock a locked screen, or display an alarm or timer according to the input event. If the input event is an output request for the icon display screen containing at least one icon, the control unit 160 proceeds to operation 407 wherein the control unit 160 checks whether an unlimited service usage step is satisfied. For example, the control unit 160 may check operability of a Wi-Fi module included in the communication unit 110. To this end, the control unit 160 may operate the Wi-Fi module to connect to a nearby access point (AP). That is, when the Wi-Fi module is turned off, the control unit 160 may turn on the Wi-Fi module and control the Wi-Fi module to search for an access point in the vicinity thereof; and when the Wi-Fi module is turned on, the control unit 160 may check whether the Wi-Fi module is connected to a nearby access point. Hence, when the mobile terminal 100 is connectable to a Wi-Fi network, the unlimited service usage condition may be satisfied. When the unlimited service usage condition is satisfied (for example, where the presence of a nearby access point permits free-of-charge unlimited usage of a data service, or connection to a Wi-Fi network permits free-of-charge unlimited usage of a data service), the control unit 160 proceeds to step 409 wherein the control unit 160 may perform icon display according to settings. For example, the control unit 160 may control the display unit 140 to output an icon of a 100 percent color without color elimination. The control unit 160 may also output at least one of a highlight, an animation effect and a text description indicating unlimited availability.

When the unlimited service usage condition is not satisfied (for example, due to inoperability of a Wi-Fi module, or disconnection from a Wi-Fi network permitting free-of-charge unlimited usage of a data service), the control unit 160 proceeds to step 411 wherein the control unit 160 identifies information on the remaining service amount. At step 413, the control unit 160 changes the color of a part of an icon in accordance with the remaining service amount and outputs the color adjusted icon on the display unit 140. Here, steps 411 and 413 may be substantially identical to steps 307 and 309, respectively, in FIG. 3.

Thereafter, at step 415, the control unit 160 checks whether an input event for terminating output of the icon display screen is generated. If such an input event is not generated, the control unit 160 returns to step 407 and continues output of the icon display screen. If such an input event is generated, the control unit 160 may return to step 403 and continue icon display based on service usage states.

Figure 5:
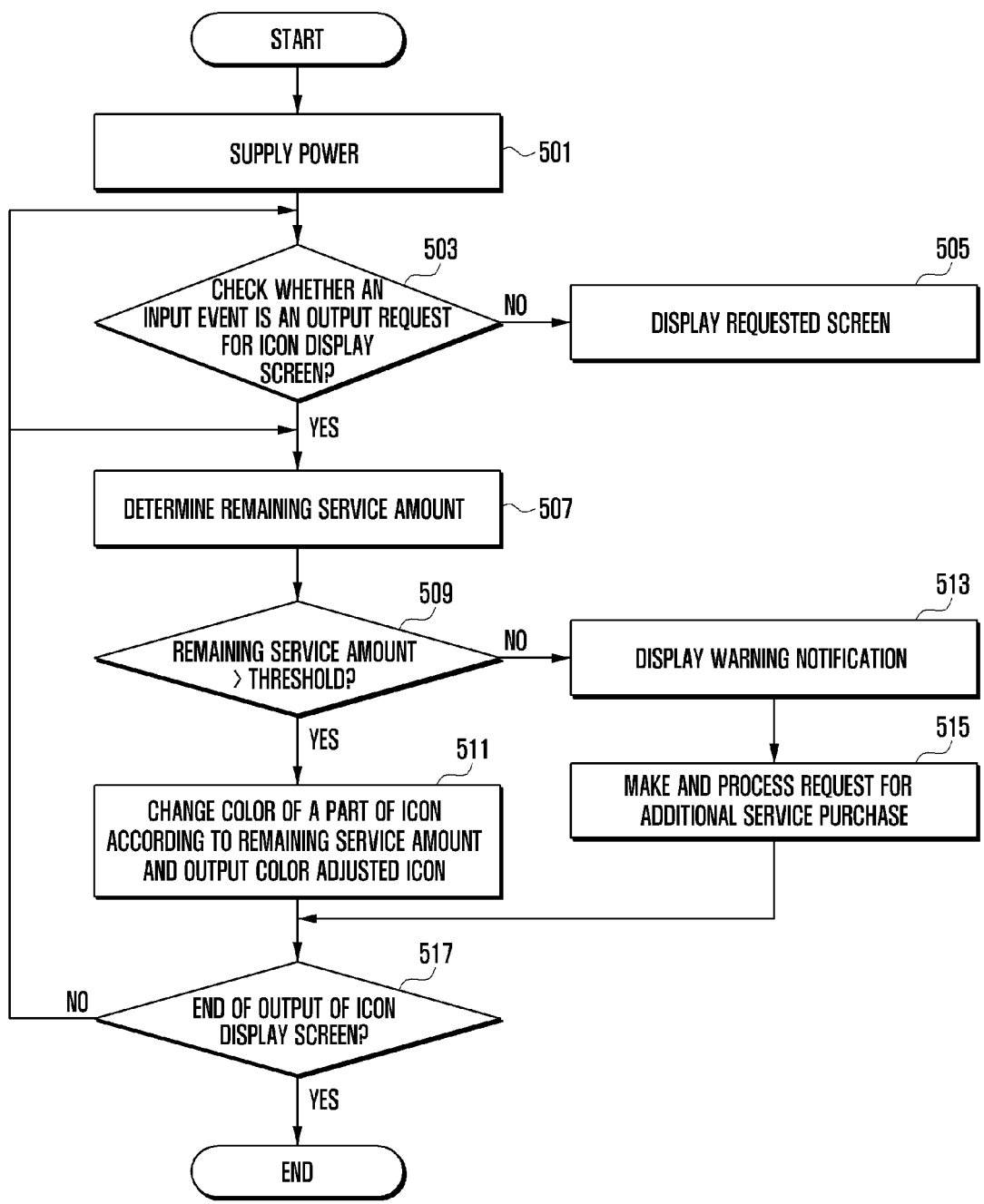
FIG. 5 is a flowchart of another method for displaying icons based on service usage states according to an embodiment of the present invention.

FIG. 5 is a flowchart of another method for displaying icons based on service usage states according to an embodiment of the present invention. The method of FIG. 5 deals with a service-related function.

Referring to FIG. 5, at operation 501, the control unit 160 of the mobile terminal 100 supplies power to individual components thereof. Upon generation of an input event, at step 503, the control unit 160 checks whether the input event is an output request for the icon display screen. If the input event is not an output request for the icon display screen, the control unit 160 proceeds to step 505 wherein the control unit 160 may perform screen display according to the input event. If the input event is an output request for the icon display screen, the control unit 160 proceeds to step 507 wherein the control unit 160 identifies an icon associated with a service having a usage limit among icons contained in the icon display screen and determines the remaining service amount for color adjustment of the identified icon.

At step 509, the control unit 160 checks whether the remaining amount value for the icon is greater than a preset threshold. If the remaining amount value for the icon is greater than the preset threshold, the control unit 160 proceeds to step 511 wherein the control unit 160 changes the color of a part of the icon in accordance with the remaining amount value and outputs the color adjusted icon on the display unit 140. Here, step 511 may be substantially identical to step 309 in FIG. 3.

If the remaining amount value for the icon is not greater than the preset threshold, the control unit 160 proceeds to step 513 wherein the control unit 160 displays a preset warning notification. For example, the control unit 160 may output a preset popup, a vibration of a given pattern or a sound notification indicating a negligible remaining service amount. At step 515, the control unit 160 makes and processes a request for the purchase of additional service according to user selection. For example, to increase the remaining amount of a data service, the control unit 160 may output a popup window recommending that the user make an additional service purchase request. When an input event accepting the additional service purchase request is generated, the control unit 160 may connect to a corresponding service provider server, output a service page provided by the service provider server, and support user interaction with the service page for purchase of additional service. Upon completion of the additional service purchase, the control unit 160 may update the total service amount and re-compute the remaining service amount accordingly. Here, the additional service purchase may correspond to an increment in the usage limit of data, or in the usage time or usage count of music, video or text content.

Thereafter, at step 517, the control unit 160 checks whether an input event for terminating output of the icon display screen is generated. If such an input event is not generated, the control unit 160 returns to step 507 and repeats examination of service usage states at regular intervals. If such an input event is generated, the control unit 160 returns to step 503 and continues icon display based on service usage states.

Figure 6:
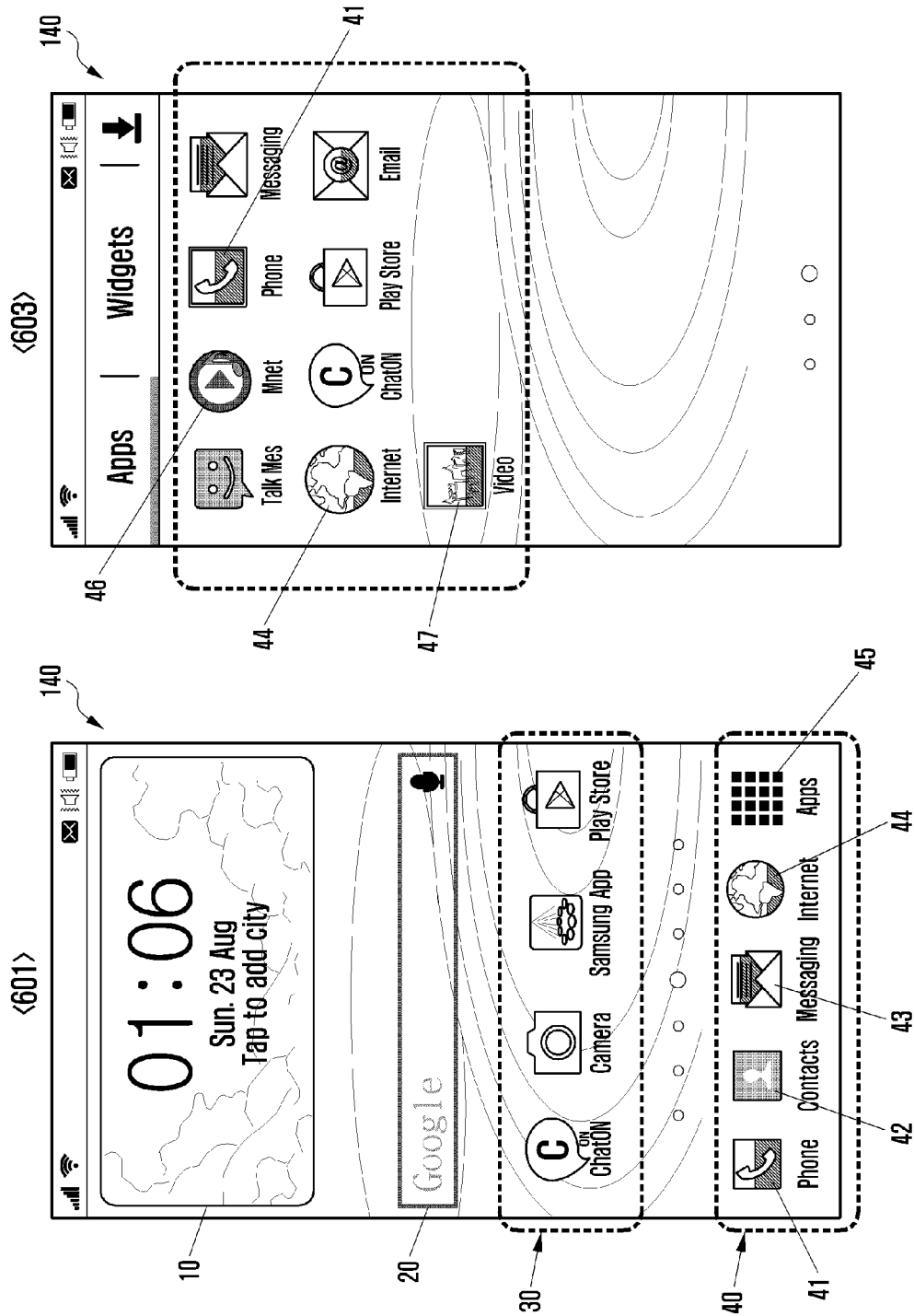
FIG. 6 illustrates screen representations of icon displays based on service usage states.

FIG. 6 illustrates screen representations of icon displays based on service usage states.

Referring to FIG. 6, in response to a user request, the control unit 160 of the mobile terminal 100 may output a home screen containing one or more icons on the display unit 140 as indicated by indicia 601. The home screen displaying icons according to service usage states may serve as an icon display screen of the present invention. The home screen indicated by indicia 601 may include a date-and-time region 10, a search region 20, an app shortcut region 30, and a basic app region 40.

The app shortcut region 30 may include an app icon linked with a camera function and an app icon linked with a playback function for files stored in the storage unit. The app shortcut region 30 may include app icons associated with a service without usage limits or app icons associated with services with a usage limits according to user settings.

The basic app region 40 may include a call app icon 41, a phonebook icon 42, a message icon 43, a web access icon 44, and an app menu icon 45. Here, the call app icon 41 and the web access icon 44 may be an icon whose color is adjusted according to the remaining service amount. In the case of the call app icon 41 associated with a call service, when a limited call plan is used, a total service amount may be set. The control unit 160 may determine the remaining service amount by accumulating the used service amount according to usage of the call service or may receive information on the remaining service amount from the corresponding service provider server. The control unit 160 may then determine a color adjustment value for the call app icon 41 according to the remaining service amount. Similarly in the case of the web access icon 44 associated with a data communication service, the control unit 160 may determine the remaining service amount by subtracting the used service amount from the total service amount or may receive information on the remaining service amount from the corresponding service provider server. The control unit 160 may then determine a color adjustment value for the web access icon 44 according to the remaining service amount. Upon determination of a color adjustment value, the control unit 160 may produce a color adjusted icon either by use of the icon table 153 or by color dilution, and then output the color adjusted icon on the display unit 140 as indicated by indicia 601.

When the app menu icon 45 is selected in a state indicated by indicia 601, the control unit 160 may output an icon display screen including various icons as indicated by indicia 603. The icon display screen may include at least one icon associated with a service having a usage limit. Here, the web access icon 44, the call app icon 41, a music content icon 46, and a video content icon 47 may be icons associated with services having a usage limits. A color adjustment may be applied to any icon display associated with a service having a usage limit. That is, the color of an icon associated with a service having a usage limit may be partly removed so as to intuitively represent the remaining amount of the service.

Figure 7:
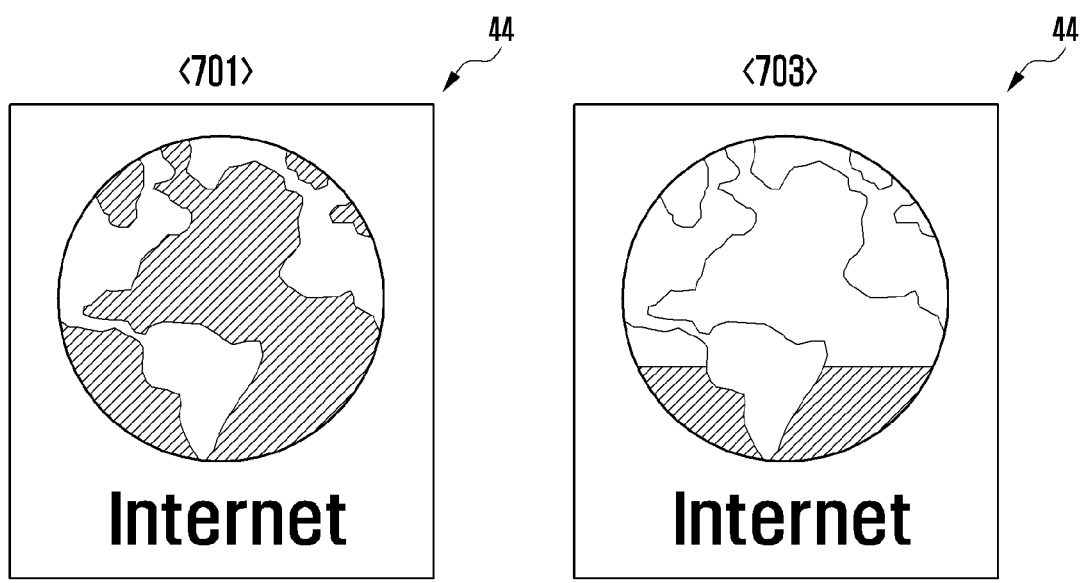
FIG. 7 is a detailed illustration of an icon display.

FIG. 7 illustrates an icon display based on service usage states, wherein a web access icon 44 is displayed in two states representing two different levels of remaining data service.

Referring to FIG. 7, the web access icon 44 may be fully filled with a color as indicated by indicia 701. This indicates that the remaining amount of the data service associated with the web access icon 44 is 100 percent. The web access icon 44 may be in a state as indicated by indicia 701 when an unlimited data service plan is used or when the mobile terminal 100 is located in a free-of-charge service zone or when the period of the service plan has just begun and data has yet to be consumed. For example, as described before, Internet access using a Wi-Fi network may correspond to a free-of-charge data service.

When the data service is consumed to some degree, the web access icon 44 may be displayed so as to indicate the remaining service amount as indicated by indicia 703. That is, the background color of the web access icon 44 is maintained, and the color of the central globe shape is partly removed according to usage of the data service. Here, the used service amount is represented by the black-and-white portion of the central globe shape, and the remaining service amount is represented by the color filled portion thereof. When the mobile terminal 100 moves into a free-of-charge Wi-Fi zone, the web access icon 44 in a state indicated by indicia 703 may be changed back to the state indicated by indicia 701. Meanwhile, color adjustment may be applied to an icon when the screen is updated. In the above description, the color of an icon is depicted as being adjusted when the icon display screen is output or when the icon is indicated. The color of a displayed icon may be gradually changed according to usage of the corresponding service. In such a case, the control unit 160 may apply a color adjustment to the icon in accordance with the screen update cycle. The display unit 140 continuously updates the screen display on a periodic basis to change the screen according to user interaction. In response to a request for displaying a color adjusted icon, the control unit 160 may put the request on hold until the next screen update cycle and control the display unit 140 to output the color adjusted icon upon arrival of the next screen update cycle.

In addition, when an icon associated with a service having a usage limit is hovered over before being selected, the control unit 160 may adjust the color of the icon in accordance with the remaining amount of the service. To this end, when a finger or touch pen is hovered for a while on an icon without physical contact, the touch panel may send a hovering event to the control unit 160. The control unit 160 may check whether the icon indicated by the hovering event is associated with a service having a usage limit. If the indicated icon is associated with a service having a usage limit, the control unit 160 may adjust the color of the indicated icon in accordance with the remaining amount of the service.

Figure 8:
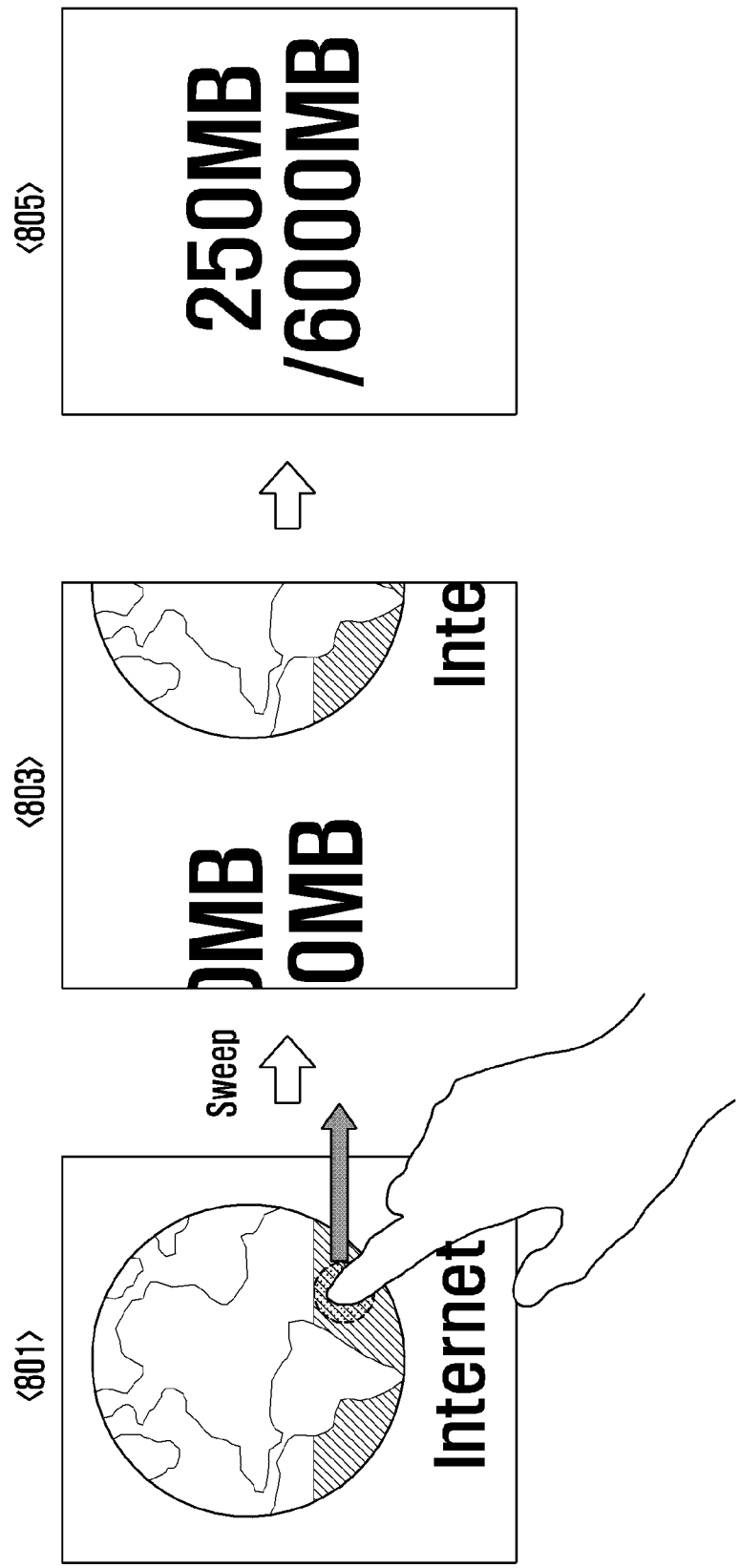
FIGS. 8 and 9 illustrate changes in icon information presentation.
Figure 9:
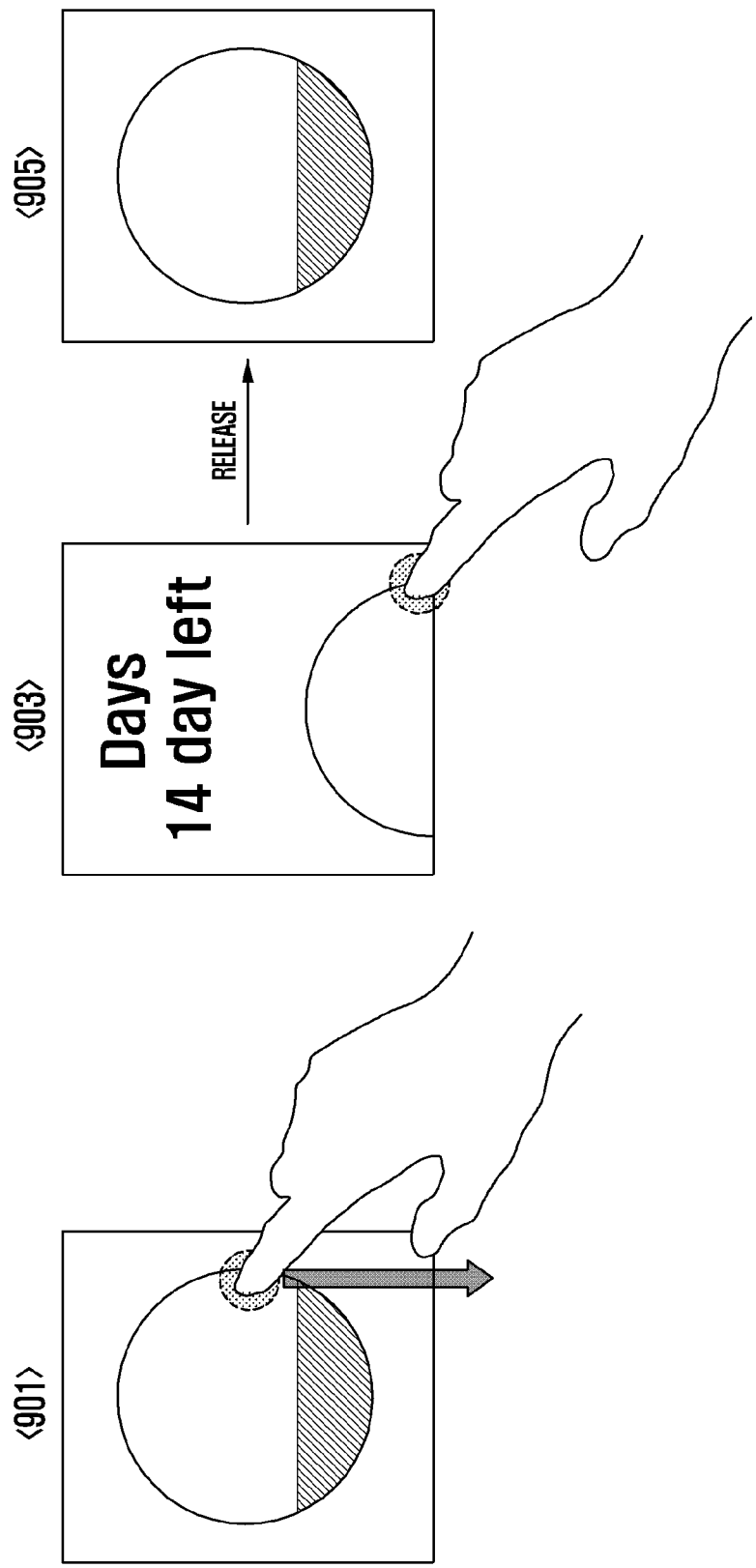

FIGS. 8 and 9 illustrate changes in presentation of information on the remaining service amount.

Referring to FIG. 8, when a color adjusted icon is output on the display unit 140, the user may intuitively recognize the remaining service amount on the basis of the color filled portion of the icon. However, the user may be unable to accurately determine the remaining service amount. To address this problem, the mobile terminal 100 may provide text information on the color adjustment as indicated by indicia 801, 802 and 805. More specifically, after selecting an icon as indicated by indicia 801, when the user generates a sweep or drag event within the icon and in a predetermined direction as indicated by indicia 803, the control unit 160 may output alphanumeric information, in the place of the icon. The alphanumeric information displayed, may be the total service amount and the remaining service amount as indicated by indicia 805. Here, the alphanumeric information output at the icon may include two values corresponding to the total service amount and the remaining service amount as indicated by indicia 805, or may include one value corresponding to the total service amount or two values corresponding to the used service amount and the remaining service amount depending upon the design. In addition, when a color adjusted icon is hovered over with a finger or the like, above the touch panel, the control unit 160 may output alphanumeric information corresponding to at least one of the total service amount, the remaining service amount or the used service amount at the icon. Similarly, when a color adjusted icon is hovered over with a touch pen, the control unit 160 may output such alphanumeric information. To support hovering with a touch pen, the mobile terminal 100 may further include a separate pen touch panel.

After display of the alphanumeric information for a preset time, in a state indicated by indicia 805, the control unit 160 may return to the state indicated by indicia 801. The control unit 160 may also return to the state indicated by indicia 801 when an event for redisplaying the icon display screen (e.g. a screen transition event, or turning the screen off and on again) is generated.

Referring to FIG. 9, after selecting a color adjusted icon as indicated by indicia 901, when the user generates a touch event in a predetermined direction on the icon, the control unit 160 may output alphanumeric information on the remaining service amount as indicated by indicia 903, and may return to the original state as indicated by indicia 905 upon release of the touch event.

Figure 10:
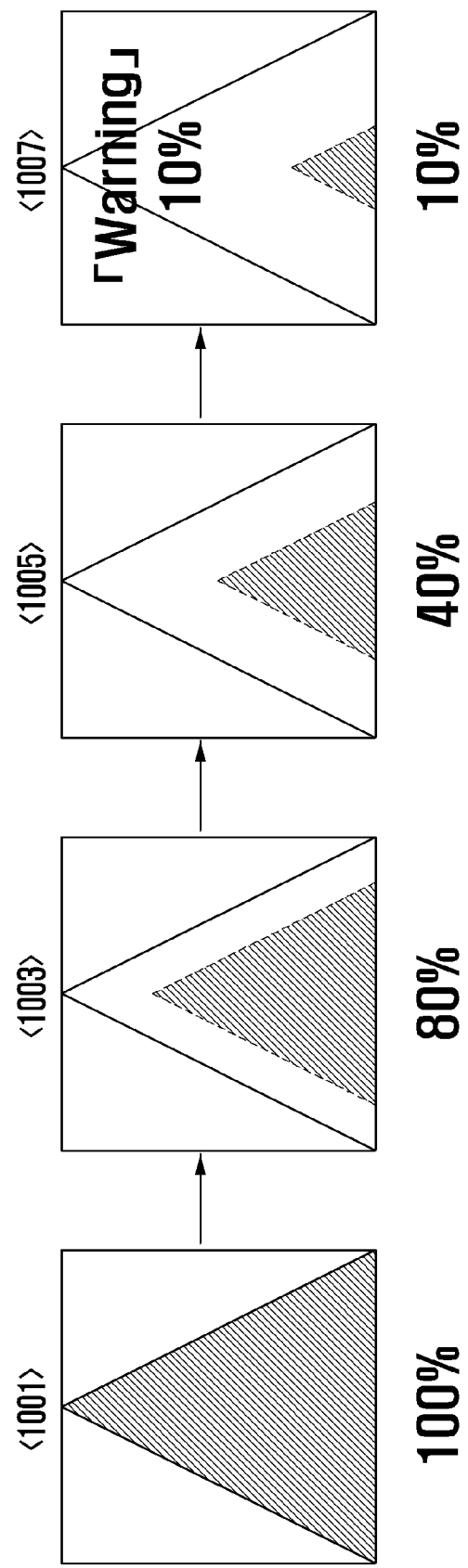
FIG. 10 is another illustration of an icon display.

FIG. 10 is another illustration of a display of a color adjusted icon.

Referring to FIG. 10, to output a color adjusted icon according to service usage states, the color filled portion of the icon may be gradually reduced in at least two directions. That is, for color adjustment of an icon, the control unit 160 may gradually reduce the color filled portion of the icon corresponding to the remaining service amount in at least two directions. In the previous description, the color filled portion of an icon corresponding to the remaining service amount is gradually reduced in one direction (top to bottom). FIG. 10 illustrates reduction of the color filled portion of an icon in various directions. For example, when the remaining service amount is 100 percent, the control unit 160 may represent the color filled portion of the icon as a triangular shape as indicated by indicia 1001. When the remaining service amount is 80 percent, the control unit 160 may reduce the color filled portion of the icon to a slightly smaller triangular shape as indicated by indicia 1003. When the remaining service amount is 40 percent, the control unit 160 may further reduce the color filled portion of the icon to a significantly smaller triangular shape as indicated by indicia 1005. Here, the color filled portion of an icon is represented in a triangular shape. However, the present invention is not limited thereto. The color filled portion of an icon, which is changed into a black-and-white portion according to a change in the remaining service amount, may be represented in one of various shapes, such as a star, rectangular, circular, oval and free form, which may be drawn in the icon region.

When the remaining service amount is less than or equal to 10 percent, the control unit 160 may output a warning message as indicated by indicia 1007. Here, text information "Warning" is output as a warning message in the icon region. However, the present invention is not limited thereto, and various warning mechanisms may be utilized. For example, when the remaining amount of a service associated with an icon is less than or equal to 10 percent, the control unit 160 may blink the icon on a periodic basis, or may blink the icon several times upon initial output of the icon display screen and output a warning message in the icon region as shown above.

Figure 11:
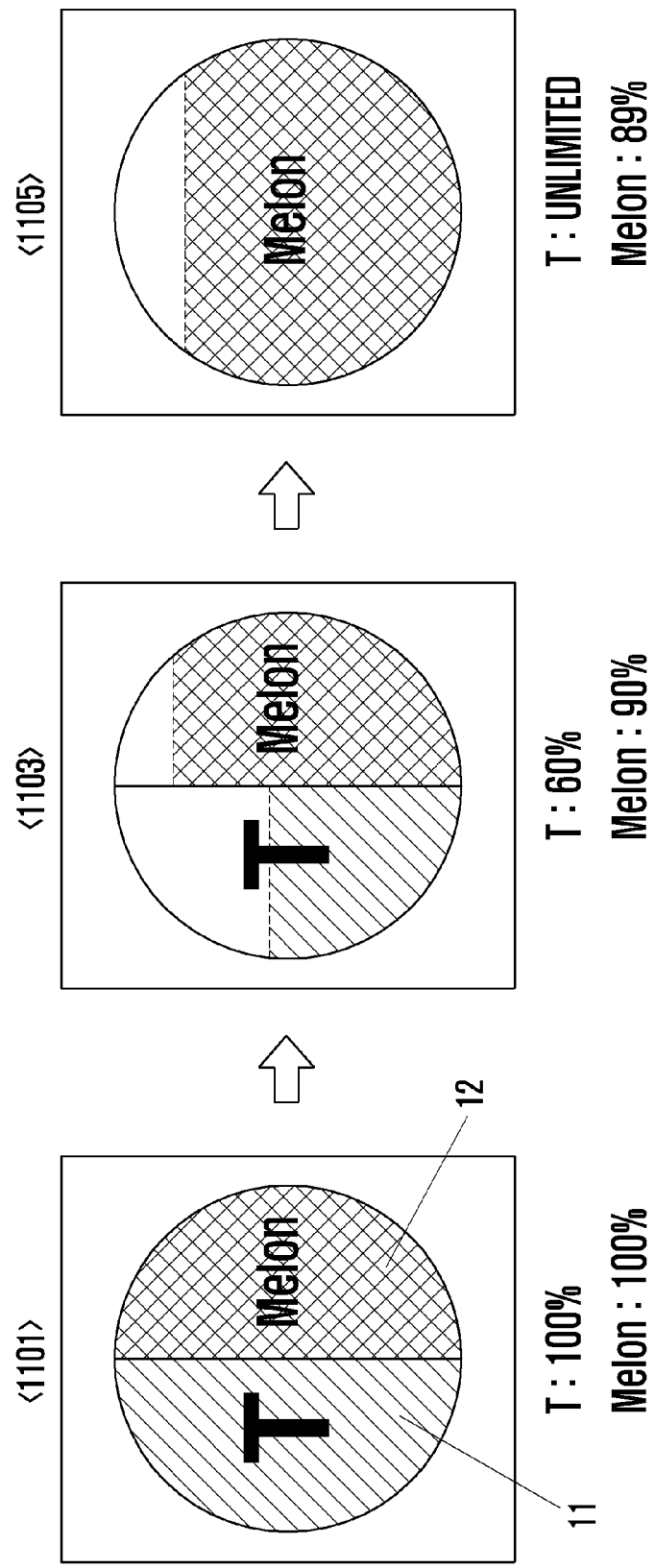
FIG. 11 is an illustration of icon display for a composite service.

FIG. 11 is an illustration of an icon display for a composite service.

Referring to FIG. 11, a service based on communication such as a music content service may have composite usage limits. For example, as a music content service is based on a data service, use of the music content service may entail data service usage and content service usage.

Hence, for a composite service, it is necessary to represent a color adjusted icon so as to have composite service usage values as indicated by indicia 1101. Here, the control unit 160 may output an icon having a remaining data usage portion 11 and a remaining music content usage portion 12.

For example, when the remaining amount of the data service is 100 percent and the remaining amount of the music content service is 100 percent, the control unit 160 may output an icon whose remaining data usage portion 11 is filled with a color and whose remaining music content usage portion 12 is filled with another color as indicated by indicia 1101. When the remaining amount of the data service is 60 percent and the remaining amount of the music content service is 90 percent, the control unit 160 may output an icon as indicated by indicia 1103. Accordingly, the user may intuitively recognize usage states of individual services in a composite service through portioned icon display.

Output of alphanumeric information described in FIGS. 8 and 9 may also be applied to an icon associated with composite service usage limits. That is, when alphanumeric information is output for an icon associated with a composite service, the control unit 160 may output text information on the remaining service amount for each component service in the composite service. For example, text information on the remaining amount of a data service and text information on the remaining amount of a music content service may both be output at the same icon region.

The icon indicated by indicia 1105 reflects a change in service usage. For example, when the mobile terminal 100 is connected to an unlimited free-of-charge network, as usage of the data service becomes unlimited and free-of-charge, the control unit 160 may output an icon having only the remaining music content usage portion 12 without the remaining data usage portion 11 as indicated by indicia 1105. Upon viewing the icon as indicated by indicia 1105, the user may recognize that the mobile terminal 100 has entered into a free-of-charge zone for a first service in the composite service, and may more accurately identify the remaining amount of the music content service.

As described hereinabove, the method of displaying icons according to service usage states and a mobile terminal supporting the same, enable the user to intuitively recognize the remaining amount of a service with a usage limit. Further, the method enables the user to easily make an additional service purchase according to ongoing service usage and to identify the remaining service amount in real time in various service usage states such as network access states.

In the above description, icon color adjustment is applied with reference to the remaining service amount. However, the present invention is not limited thereto. For example, icon color adjustment may be applied with reference to the used service amount.

Meanwhile, the mobile terminal 100 may further include various components according to design. For example, when the mobile terminal 100 is a communication terminal, the mobile terminal 100 may further include a local area communication module for local area communication, a data communication interface based on wired and wireless communication, an Internet communication module for Internet access and communication, and a digital broadcast reception module for receiving and playing digital broadcasts. Although possible variations according to the trend of digital convergence are too numerous to enumerate, it should be apparent to those skilled in the art that the mobile terminal 100 may further include a unit comparable to the above-described units, and a unit of the mobile terminal 100 may be removed or replaced with another unit.

The mobile terminal 100 of the present invention may be any information and communication appliance or multimedia appliance, such as a mobile communication terminal based on communication protocols supporting various communication systems, portable multimedia players (PMP), digital broadcast receivers, personal digital assistants (PDA), music players, such as MP3 players), portable game consoles, smartphones, laptop computers, or handheld computers.

While the present invention has been shown and described with reference to certain embodiments thereof, it will be understood by those skilled in the art that various changes in form and details may be made therein without departing from the spirit and scope of the present invention as defined by the appended claims. Therefore, various modified implementations can be made without departing from the substance of the present invention claimed in the appended claims, and the modified implementations should not be construed separately from the technical idea or concept of the present invention.

What is claimed is:

1. A method of displaying icons for a mobile terminal, according to service usage states, the method comprising:
   examining a network connection state for at least one service having a usage limit;
   displaying, when the mobile terminal is connected to a network permitting unlimited free-of-charge service usage, an icon associated with the service as an icon filled with a color image; and
   displaying, when the mobile terminal is connected to a network restricting service usage according to the usage limit, the icon associated with the service as a color adjusted icon composed of a black-and-white image representing the used service amount and a color image representing a remaining service amount.

2. The method of claim 1, further comprising:
   connecting to a service provider server to collect information on the used and remaining service amounts; and
   receiving information on the used and remaining service amounts from the service provider server.

3. The method of claim 1, further comprising:
   displaying, when the remaining service amount is less than or equal to a threshold value, a warning message; and
   outputting guidance information recommending an additional service purchase and handling an additional service purchase according to an input signal.

4. A mobile terminal supporting icon display based on service usage states, the mobile terminal comprising:
   a communication unit configured to support network access for at least one service having a usage limit;
   a control unit configured to control a process of displaying, when the communication unit is connected to a network permitting unlimited free-of-charge service usage, an icon associated with the service as an icon filled with a color image, and displaying, when the communication unit is connected to a network restricting service usage according to the usage limit, the icon associated with the service as a color adjusted icon composed of a black-and-white image representing the used service amount and a color image representing the remaining service amount; and
   a display unit to display the color adjusted icon.

5. The mobile terminal of claim 4, wherein the control unit comprises at least one of:
   a service network examiner configured to, for a service, connect to a service provider server to collect information on the used and remaining service amounts, and to receive information on the used and remaining service amounts from the service provider server; and
   a service terminal examiner configured to, for a service, accumulate and store information on service usage and compute the remaining service amount by subtracting the used service amount from the total service amount stored in advance.

6. The mobile terminal of claim 4, wherein, when the remaining amount of a service is less than or equal to a threshold value, the control unit controls the display unit to display a warning message.

7. The mobile terminal of claim 4, wherein the control unit controls the display unit to output guidance information recommending an additional service purchase and handles an additional service purchase according to an input signal.

8. The mobile terminal of claim 4, wherein, when the remaining amount of a service is less than or equal to a threshold value, the display unit outputs a warning message in an icon associated with the service.

9. The mobile terminal of claim 4, wherein the control unit controls, in response to an input event, an operation to display the remaining service amount corresponding to the color image as text information at the icon.

10. The mobile terminal of claim 4, wherein the display unit displays an icon associated with a composite service as a color adjusted icon composed of distinct color images corresponding respectively to the remaining amounts of multiple component services.

11. The mobile terminal of claim 10, wherein, when a component service is changed to an unlimited free-of-charge service, the control unit controls the display unit to display the color adjusted icon without a color image related to the changed component service.

12. A method of displaying icons according to service usage states for a mobile terminal, the method comprising:
    displaying an icon for selecting a service having a usage limit, wherein the icon has a fixed area and the entire fixed area is displayed in a first color scheme representing a 100 percent remaining service amount;
    collecting information on a remaining service amount for the service; and
    adjusting a color scheme of a portion of the fixed area of the icon according to the information on the remaining service amount, wherein a size of the portion of the fixed area of the icon directly corresponds to a percentage of a used service amount among the 100-percent remaining service amount.

13. The method of claim 12, further comprising receiving an output request for an icon display screen including the icon.

14. The method of claim 13, further comprising receiving an input event for indicating the icon from the icon display screen.

15. The method of claim 14, wherein the input event corresponds to hovering of a touch object on a touch panel displaying the icon without contact.

16. The method of claim 12, wherein collecting the information comprises:
    collecting information on a total service amount;
    accumulating and storing the used service amount; and
    computing the remaining service amount by subtracting the used service amount from the total service amount.

17. The method of claim 16, further comprising:
    connecting to a service provider server and receiving information on the used and remaining service amounts therefrom on a periodic basis; and
    synchronizing the used and remaining service amounts obtained by computation, with the used and remaining service amounts received from the service provider server.

18. The method of claim 12, wherein collecting the information comprises:
    connecting through a service network examiner to a service provider server providing the service on a periodic basis; and
    receiving information on the remaining service amount from the service provider server.

19. The method of claim 18, wherein collecting the information further comprises allocating network examiners that are used to connect to an individual service provider server providing services linked with the icon.

20. The method of claim 12, wherein adjusting the color scheme of the portion of the fixed area comprises one of:
    outputting the first color scheme as a color image portion of the icon corresponding to the remaining service amount and outputting the color scheme of the portion of the fixed area as a black-and-white image portion corresponding to the used service amount;

selecting one of predefined color adjusted icons corresponding to a remaining service amount from an icon table and outputting the selected color adjusted icon; and removing the first color scheme of the portion of the fixed area corresponding to the used service amount.

21. The method of claim 12, further comprising:

receiving an input event occurring on the icon; and hiding, upon receipt of the input event, the icon and outputting text information indicating the remaining service amount.

22. The method of claim 21, further comprising recovering, when the input event is released or a preset duration expires, the icon.

23. The method of claim 12, wherein adjusting the color scheme of the portion of the fixed area further comprises displaying the icon associated with a composite service as a color adjusted icon composed of distinct color images corresponding respectively to the remaining amounts of multiple component services.

24. The method of claim 23, further comprising removing, when a component service is changed to an unlimited free-of-charge service, a color image related to the changed component service from the icon.

25. The method of claim 12, wherein adjusting the color scheme of the portion of the fixed area comprises displaying, when the service linked with the icon is changed to an unlimited free-of-charge service in response to a network connection state change, the icon in the first color scheme corresponding to a 100-percent remaining service amount.

26. The method of claim 12, wherein adjusting the color scheme of the portion of the fixed area comprises displaying, when the remaining service amount is less than or equal to a threshold value, a warning message on the icon.

27. The method of claim 26, wherein adjusting the color scheme of the portion of the fixed area further comprises performing a procedure for requesting and handling an additional service purchase.

\* \* \* \* \*